(12) United States Patent
Chen et al.

(10) Patent No.: US 8,872,747 B2
(45) Date of Patent: Oct. 28, 2014

(54) LCD PANEL WITH STRUCTURE OF CS-ON-GATE TYPE STORAGE CAPACITOR CONNECTING WITH THIN FILM TRANSISTOR

(71) Applicant: Wintek Corporation, Taichung (TW)

(72) Inventors: Yu-Ting Chen, Chiayi (TW); Hung-Jen Wang, Sinjhuang (TW)

(73) Assignee: Wintek Corporation, Taichung (TW)

( * ) Notice: Subject to any disclaimer, the term of this patent is extended or adjusted under 35 U.S.C. 154(b) by 0 days.

(21) Appl. No.: 13/970,668

(22) Filed: Aug. 20, 2013

(65) Prior Publication Data

US 2013/0335654 A1    Dec. 19, 2013

Related U.S. Application Data

(62) Division of application No. 12/724,624, filed on Mar. 16, 2010, now abandoned.

(30) Foreign Application Priority Data

Mar. 17, 2009 (TW) ................................ 98108660 A

(51) Int. Cl.
G09G 3/36 (2006.01)
G02F 1/1362 (2006.01)
G02F 1/1337 (2006.01)

(52) U.S. Cl.
CPC ...... G02F 1/136213 (2013.01); G09G 2320/02 (2013.01); G09G 2330/06 (2013.01); G09G 3/3655 (2013.01); G09G 2300/0426 (2013.01); G02F 1/133707 (2013.01)
USPC .......................................................... 345/98

(58) Field of Classification Search
CPC ............................ G02F 1/1362; G09G 3/3614
USPC ................. 345/87, 90, 98, 100, 204, 690, 88
See application file for complete search history.

(56) References Cited

U.S. PATENT DOCUMENTS

| 6,031,514 | A  | * | 2/2000  | Hashimoto et al. ............. 345/94 |
| 7,184,011 | B2 |   | 2/2007  | Lee et al. |
| 7,298,165 | B2 | * | 11/2007 | Chang et al. ............. 324/760.02 |
| 8,072,409 | B2 | * | 12/2011 | Fanchiang et al. ............. 345/98 |

(Continued)

FOREIGN PATENT DOCUMENTS

| KR | 1020080054658 | 6/2008 |
| TW | I285778 | 8/2007 |
| TW | I286235 | 9/2007 |

OTHER PUBLICATIONS

Taiwanese language office action dated Oct. 31, 2012.

(Continued)

Primary Examiner — Pegeman Karimi
(74) Attorney, Agent, or Firm — McClure, Qualey & Rodack, LLP

(57) ABSTRACT

A liquid crystal display (LCD) panel is provided. The LCD panel includes a plurality of pixel units each having a storage capacitor, a plurality of scan lines coupled to the pixel units, and a plurality of storage capacitor charge transistors each respectively coupled to the storage capacitors of the corresponding pixel units and further coupled to two of the scan lines. The storage capacitor charge transistors are used for charging the storage capacitors of the pixel units.

13 Claims, 13 Drawing Sheets

(56) References Cited

U.S. PATENT DOCUMENTS

| | | |
|---|---|---|
| 2006/0109405 A1 | 5/2006 | Chang et al. |
| 2006/0215081 A1 | 9/2006 | Song et al. |
| 2006/0284811 A1* | 12/2006 | Huang .......................... 345/92 |
| 2007/0004071 A1* | 1/2007 | Lee et al. ..................... 438/30 |
| 2010/0164849 A1* | 7/2010 | Lan et al. ..................... 345/88 |

OTHER PUBLICATIONS

English language translation of abstract of TW I285778 (published Aug. 21, 2007).

English language translation of abstract of TW I286235 (published Sep. 1, 2007).

English language translation of KR 10-2008-0054658 (published Jun. 19, 2008).

* cited by examiner

PE

615

PE

815

PE

915

LCD PANEL WITH STRUCTURE OF CS-ON-GATE TYPE STORAGE CAPACITOR CONNECTING WITH THIN FILM TRANSISTOR

This application is a divisional application of co-pending U.S. application Ser. No. 12/724,624, filed Mar. 16, 2010, which claims the benefit of Taiwan application Ser. No. 98108660, filed Mar. 17, 2009, the subject matter of which is incorporated herein by reference.

FIELD OF THE INVENTION

The invention relates in general to a liquid crystal display (LCD) panel capable of preventing toggling of the common voltage from affecting the ON/OFF state of the pixel, so that mal-discharge or other negative effects will not occur in the pixel. Also, the storage capacitor of the LCD panel is helpful in increasing the intensity of the electrical field so as to achieve a better multi-domain liquid crystal tilting effect.

BACKGROUND

Liquid crystal display (LCD), having advantages of low radiation and low power consumption, has gradually become a mainstream display product. In a liquid crystal display, a liquid crystal panel includes a pixel array, formed by a plurality of pixel units. Each pixel unit basically includes a thin-film-transistor (TFT) used as a switch, a storage capacitor (Cs) and a liquid crystal capacitor. Types of the storage capacitor include Cs-on-Gate type storage capacitor and Cs-on-Common type storage capacitor.

In the liquid crystal panel using the Cs-on-Common type storage capacitor, the Cs-on-Common storage capacitor is coupled between the common electrode and the pixel electrode. When the scan line is turned on, the cross-voltage of the Cs-on-Common storage capacitor is about +5V. Thus, due to the insufficient intensity of the electrical field, it is difficult to achieve liquid crystal stabilizing alignment by the common electrode in the multi-domain mode.

In the liquid crystal panel using the Cs-on-Gate type storage capacitor, the Cs-on-Gate storage capacitor is coupled between the pixel electrode and the next scan line. When the scan line is turned on, the cross-voltage of the Cs-on-Gate storage capacitor is about +15V. Thus, the electrical field has sufficient intensity. But, toggle of the common voltage may cause toggle of the voltage of the pixel electrode. The toggle of the voltage of the pixel electrode may negatively affect the next scan line through the storage capacitor and make the logic low voltage of the next scan line unstable, and mal-discharge or other negative effect may occur to the corresponding TFT of the next scan line.

SUMMARY

One example of the invention is directed to a liquid crystal display (LCD) panel, in which the disclosed storage capacitor provides strong electrical field to achieve better wide view angle effect and better liquid crystal tilting effect.

Another example of the invention is directed to an LCD panel having a storage capacitor charge control switch, wherein even if the common voltage toggles, the toggle of the common voltage does not affect the ON/OFF state of the pixel and accordingly, mal-discharge in pixels is prevented.

According to a first embodiment of the present invention, a display panel is provided. The display panel includes a pixel array comprising a plurality of pixel units each at least comprising a storage capacitor; a plurality of scan lines coupled to the pixel units; and a plurality of storage capacitor charge transistors, each respectively coupled to the storage capacitors of the corresponding pixel units and further coupled to two of the scan lines, and the storage capacitor charge transistors used for charging the storage capacitors of the corresponding pixel units.

According to a second embodiment of the present invention, a display panel is provided. The display panel includes: at least one pixel unit having at least one storage capacitor having a first terminal and a second terminal; a first scan line coupled to the pixel unit; a second scan line; and at least one storage capacitor charge transistor comprising a first terminal coupled to the first terminal of the storage capacitor of the pixel unit, a second terminal coupled to the first scan line, and a third terminal coupled to the second scan line.

According to a third embodiment of the present invention, a display panel is provided. The display panel includes at least one first active element, and a plurality of pixel unit. Each pixel unit includes a data line, a scan line, a pixel electrode, a second active element, and an electrode. The second active element includes a first terminal coupled to the scan line, a second terminal coupled to the data line, and a third terminal coupled to the pixel electrode. The electrode is disposed along the pixel electrode, the scan line and the data line, wherein the electrode is coupled to the first active element and a storage capacitor is defined by the electrode and the pixel electrode.

It is to be understood that both the foregoing general description and the following detailed description are exemplary and explanatory only and are not restrictive of the disclosed embodiments, as claimed.

DETAILED DESCRIPTION OF EXEMPLARY EMBODIMENTS OF THE INVENTION

One embodiment of the invention provides a storage capacitor structure capable of avoiding mal-discharging in pixels. When the common voltage toggles, the toggling common voltage will not affect the ON/OFF state of the pixel. Besides, the storage capacitor provides strong electrical field enough to achieve better multi-domain liquid crystal tilting effect.

Figure 1:
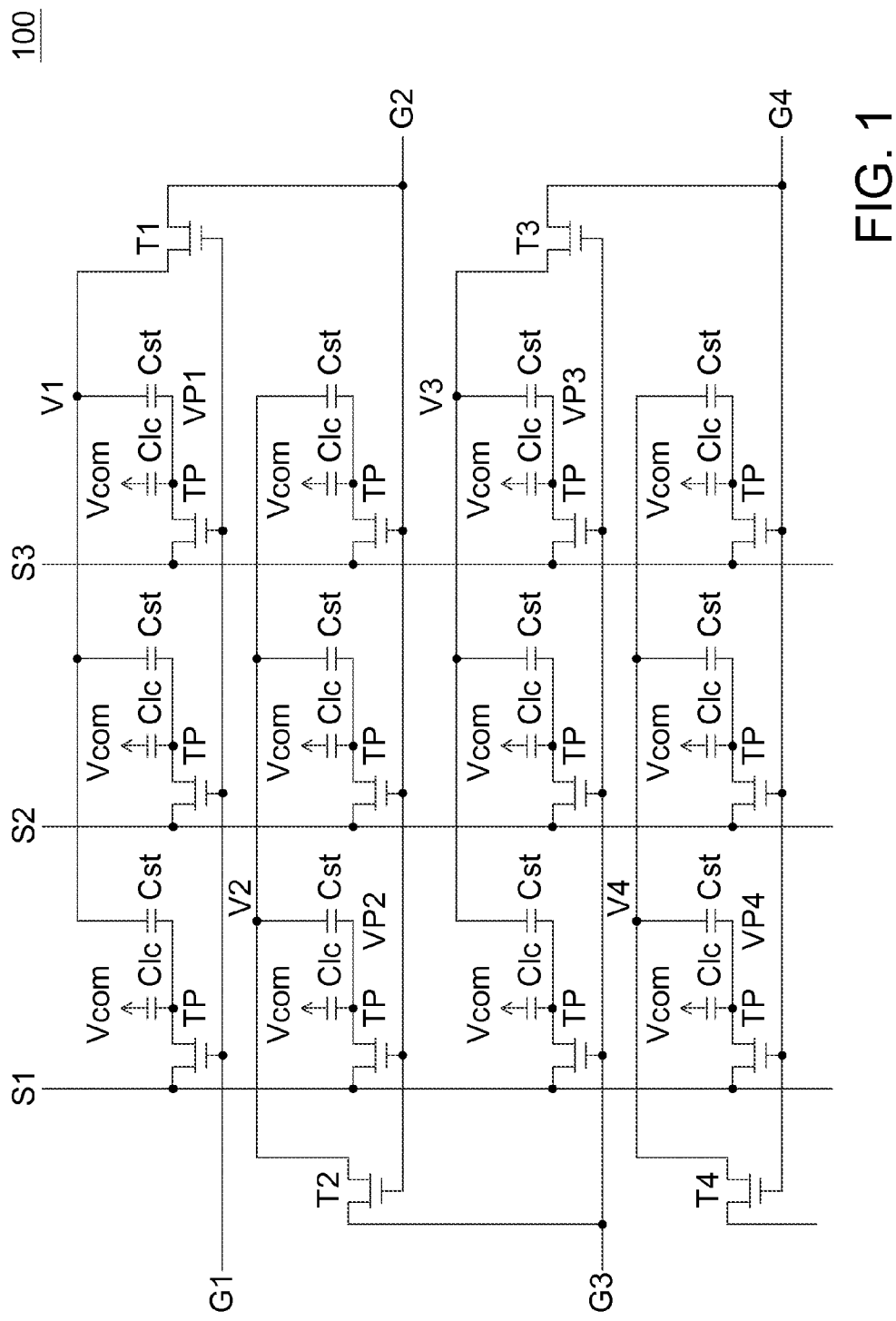
FIG. 1 shows an equivalent circuit diagram of a pixel array of an embodiment of the invention.

FIG. 1 shows an equivalent circuit diagram of a pixel array of an embodiment of the invention. As indicated in FIG. 1, the LCD panel 100 includes: a pixel array having a plurality of pixel units, a plurality of storage capacitor charge transistors, a plurality of scan lines, and a plurality of data lines. For the sake of simplicity, only four scan lines G1~G4, four storage capacitor charge transistors T1~T4, three data lines S1~S3, and 12 pixel units are illustrated in FIG. 1. However, anyone who is skilled in this technology will understand that embodiments of the invention are not limited thereto. In the present embodiment of the invention, the storage capacitor is exemplified by a Cs-on-Gate storage capacitor.

As indicated in FIG. 1, each pixel unit includes an active element TP (such as a TFT), a liquid crystal capacitor Clc and a storage capacitor Cst. The active element TP includes a gate coupled to the scan line, a source coupled to the data line, and a drain coupled to both the storage capacitor Cst and the liquid crystal capacitor Clc. The liquid crystal capacitor Clc is coupled between the common voltage VCOM and the drain of the active element TP. The storage capacitor Cst is coupled between the drain of the active element TP and a terminal (for example, the source) of the storage capacitor charge transistor.

In the present embodiment of the invention, the storage capacitor charge transistor is disposed at a terminal of each scan line. For example, the storage capacitor charge transistor T1 is disposed at a terminal of the scan line G1 and so on. The storage capacitor charge transistor includes a gate coupled to the scan line, a source coupled to the storage capacitor Cst, and a drain coupled to a next scan line. However, embodiments of the invention are not limited by disposition of the storage capacitor charge transistor disclosed above.

Next, referring to FIGS. 2~5, circuit operations of the present embodiment of the invention are illustrated. In FIGS. 2~5, V1~V4 denote node voltages and VP1~VP4 denote voltages of each respective pixel electrode. FIGS. 2~5 respectively show the circuit operation of the liquid crystal panel 100 of the present embodiment of the invention when the scan lines G1~G4 are sequentially turned on.

Figure 2:
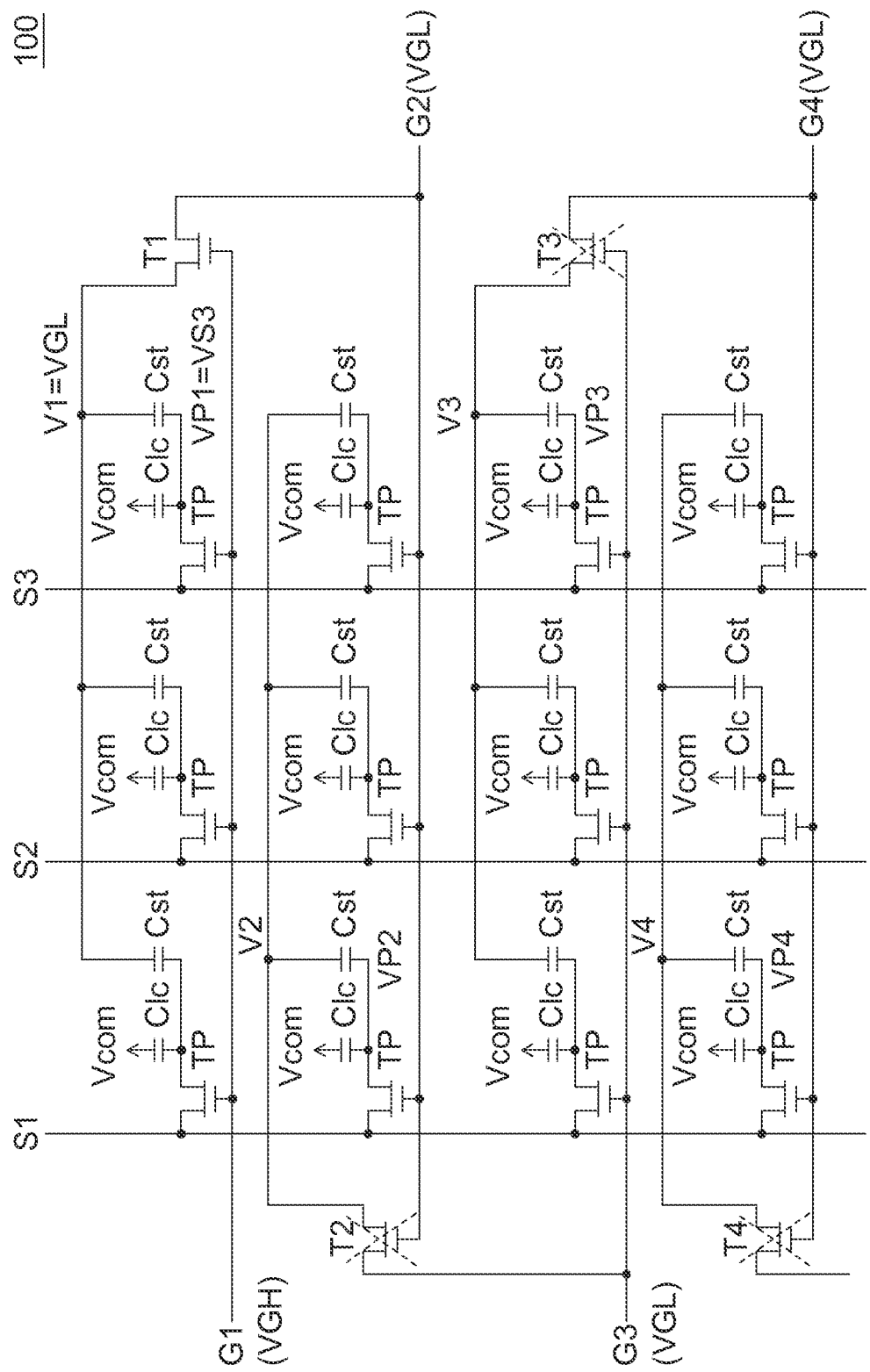
FIG. 2 shows an operation diagram of an LCD panel when a scan line G1 is turned on, according to the embodiment of the invention.

As indicated in FIG. 2, when the scan line G1 is turned on (that is, the scan line G1 is at a high potential VGH), the active element TP and the storage capacitor charge transistor T1 are in ON state. As the active element TP is ON, the potential of the node voltage VP1 is the potential VS3 of the data line S3. As the storage capacitor charge transistor T1 is ON but the scan line G2 is not turned on yet (that is, the scan line G2 is at a low potential VGL), the potential of the node voltage V1 is VGL. Meanwhile, the cross-voltage of the storage capacitor Cst equals (VS3-VGL). For example, VS3=+5V, VGL=-10V. Then, the cross-voltage of the storage capacitor Cst is expressed as: +5V-(-10V)=+15V. Thus, the electrical field strength would suffice to make the liquid crystal present required optical properties.

Charge of the storage capacitor Cst is completed during the turned-on period of the scan line G1. The cross-voltage of the storage capacitor Cst is a write voltage of the pixel unit.

Meanwhile, as the storage capacitor charge transistor T2~T4 are all turned off, the node voltages V2~V4 are all in a floating state.

Figure 3:
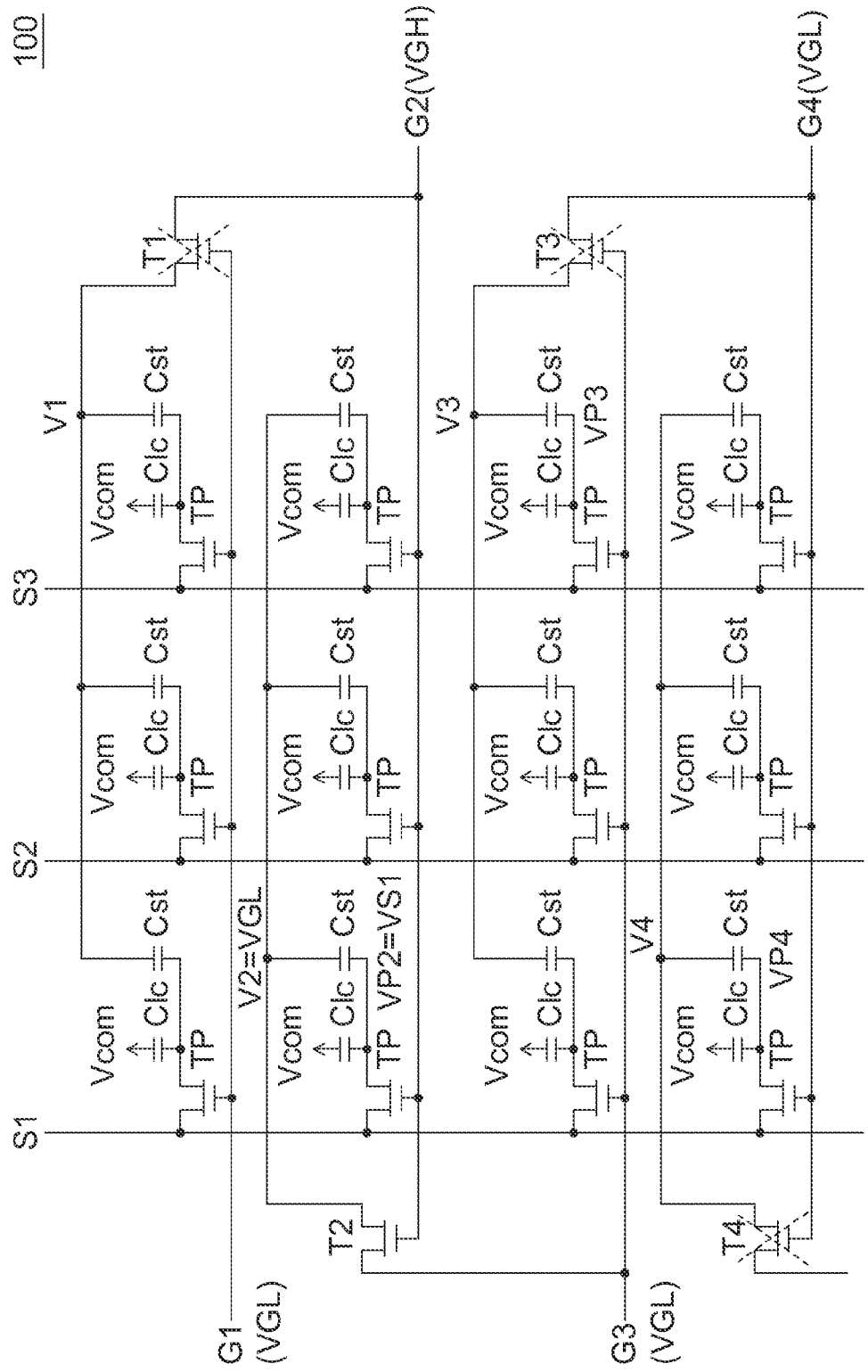
FIG. 3 shows an operation diagram of an LCD panel when a scan line G2 is turned on, according to the embodiment of the invention.

Now please refer to FIG. 3, which shows an operation diagram of the LCD panel 100 of the present embodiment of the invention when the scan line G2 is turned on. As indicated in FIG. 3, when the scan line G2 is turned on (that is, the scan line G2 is at high potential VGH), the active element TP and the storage capacitor charge transistor T2 are ON, so that the potential of the node voltage VP2 is VS1 (the potential of the data line S1) and the potential of the node voltage V2 is VGL.

Meanwhile, as the storage capacitor charge transistors T1, T3 and T4 are all turned off, the node voltages V1, V3 and V4 are floating. Despite the common voltage VCOM toggles and the toggling voltage would affect the voltage V1 through the liquid crystal voltage Clc and the storage capacitor Cst, the toggling common voltage VCOM will not affect the scan line G1 now at low voltage VGL as the storage capacitor charge transistor T1 is turned off. Thus, the ON/OFF state of the corresponding pixel unit connected to the scan line G1 is not affected by the toggling common voltage VCOM.

Figure 4:
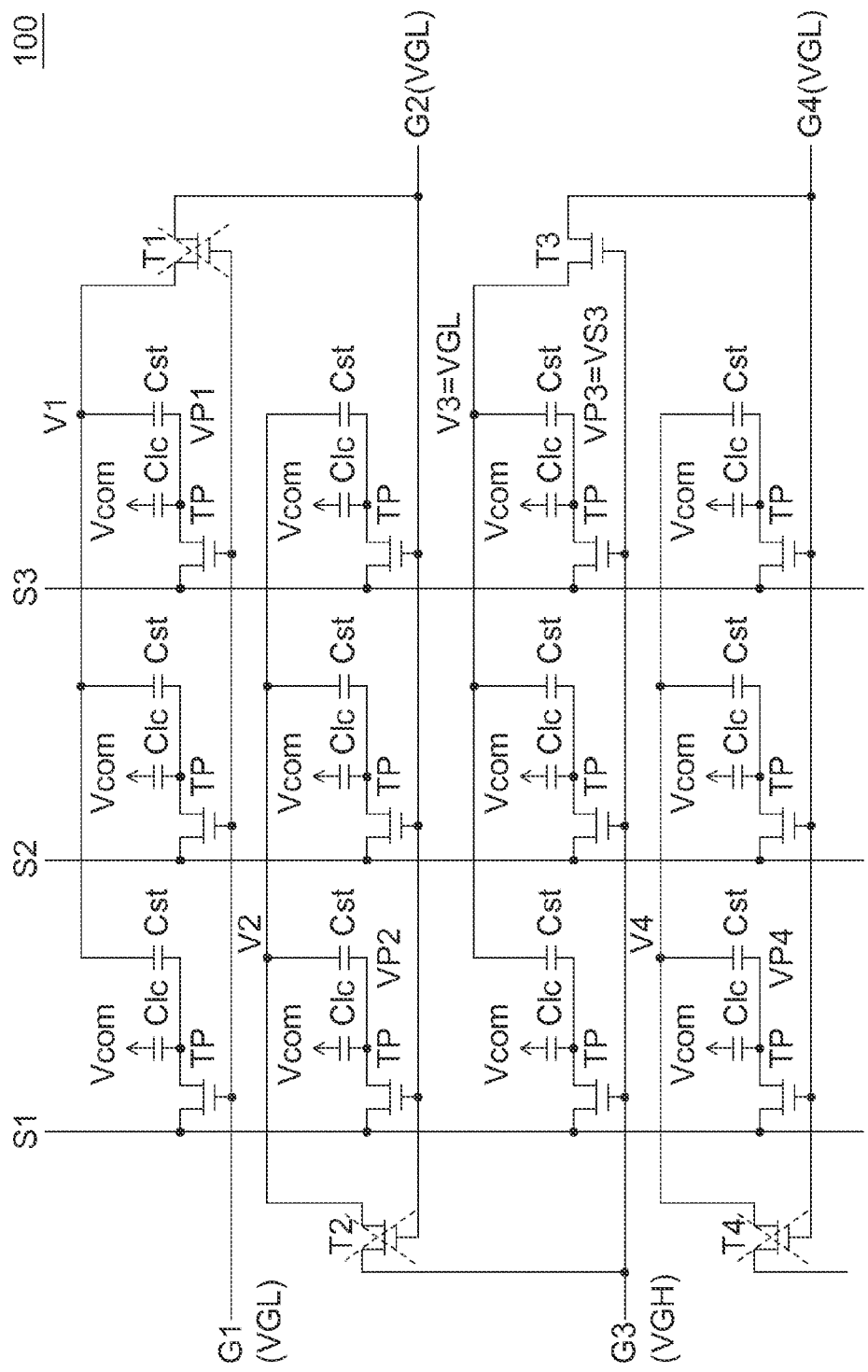
FIG. 4 shows an operation diagram of an LCD panel when a scan line G3 is turned on, according to the embodiment of the invention.
Figure 5:
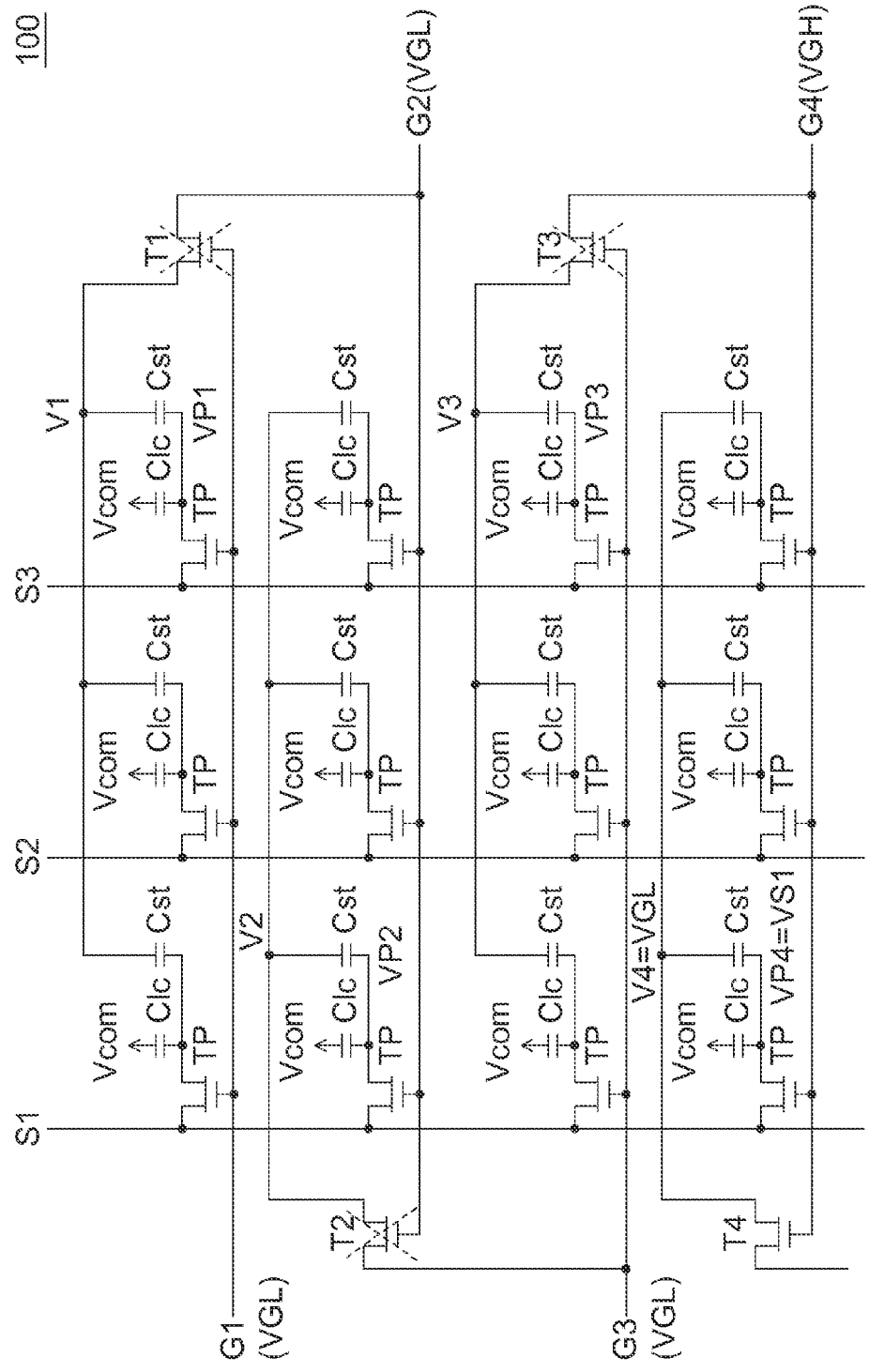
FIG. 5 shows an operation diagram of an LCD panel when a scan line G4 is turned on, according to the embodiment of the invention.

Likewise, in FIG. 4, despite the common voltage VCOM toggles and the toggling common voltage VCOM would affect the voltage V2 through liquid crystal voltage Clc and the storage capacitor Cst, the toggling common voltage VCOM will not affect the scan line G2 now at a low voltage VGL as the storage capacitor charge transistor T2 is turned off. Thus, the ON/OFF state of the corresponding pixel units connected to the scan line G2 is not affected by the toggling common voltage VCOM Likewise, in FIG. 5, despite the common voltage VCOM toggles and the toggling common voltage VCOM would affect the voltage V3 through the liquid crystal voltage Clc and the storage capacitor Cst, the toggling common voltage VCOM will not affect the scan line G3 at a low voltage VGL as the storage capacitor charge transistor T3 is turned off. Thus, the ON/OFF state of the corresponding pixel units connected to the scan line G3 is not affected by the toggling common voltage VCOM.

According to the embodiment of the invention, as the storage capacitor charge transistor is disposed at one terminal of the scan line, the cross-voltage of the storage capacitor is large enough to provide a strong electrical field, thereby achieving a better multi-domain liquid crystal tilting effect. Besides, despite the common voltage toggles, the toggling common voltage will not affect the ON/OFF state of the pixel units. Therefore, the pixel units are prevented from maldischarging.

Figure 6A:
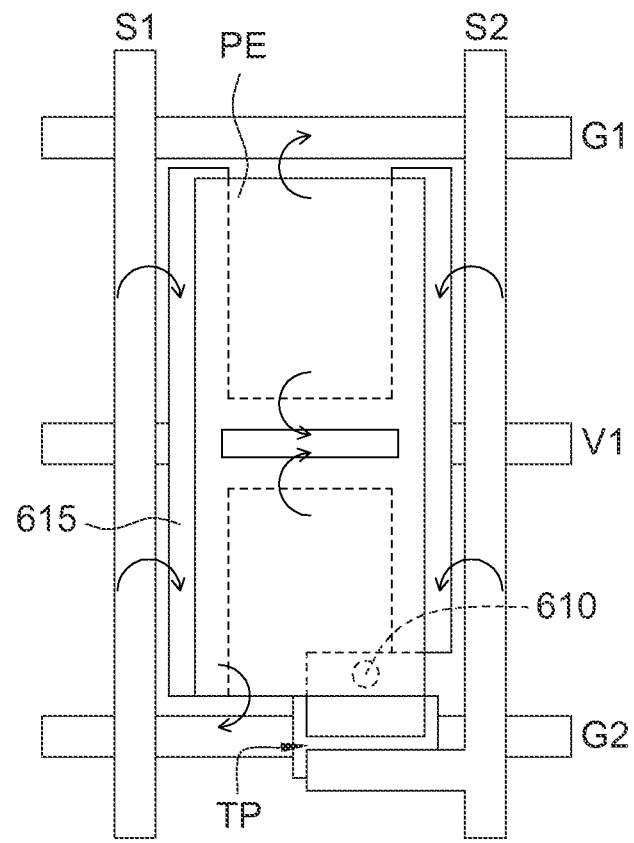
FIGS. 6A~6C are structural diagrams of a pixel unit according to a first example of the present embodiment of the invention.

FIG. 6A shows a structural diagram of a pixel unit according to a first example of the present embodiment of the invention. As indicated in FIG. 6A, the pixel unit at least includes a scan line, a data line, a pixel electrode PE, an active element TP, an electrode 615 and a via hole 610. Of course, the LCD panel may further include other elements such as an upper substrate and a lower substrate opposite to the upper substrate, and a liquid crystal layer disposed between the upper substrate and the lower substrate. According to the embodiment of the invention, the pixel unit is formed on the lower substrate and may further include other elements. For the sake of simplicity, these elements are not illustrated.

Figure 6B:
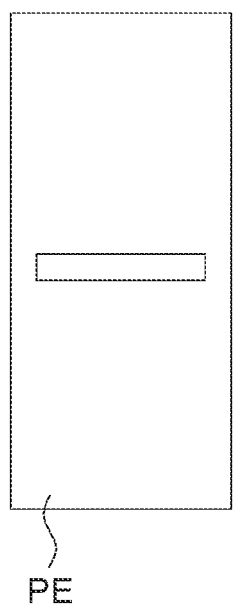
Figure 6C:
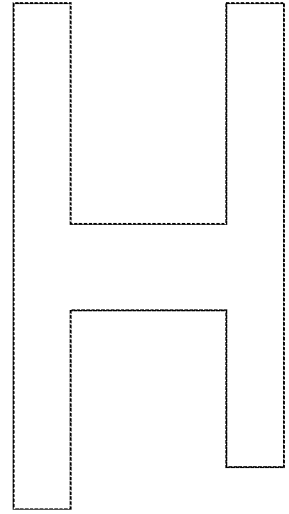

The via hole 610 is used for coupling the source of the active element TP to the pixel electrode PE. The storage capacitor Cst of the present embodiment of the invention is defined by the electrode 615 and the pixel electrode PE. In FIG. 6A, the electrode 615 is a single H electrode, and the storage capacitor Cst is also a single H capacitor. The electrode 615 is disposed along the pixel electrode PE, the scan line and the data line. The electrode 615 is directly electrically connected to the node V1 and the storage capacitor charge transistor. FIG. 6B and FIG. 6C respectively show the pixel electrode PE and the electrode 615 of FIG. 6A.

There is electrical field effect occurring between the storage capacitor and adjacent scan lines and between the storage capacitor and adjacent data lines as indicated in the arrow of FIG. 6A. The electrical field effect enables multi-domain liquid crystal tilting. Multiple liquid crystal tilting angles in the liquid crystal panel enable the liquid crystal display to achieve wide view angle effect. The enhanced cross-voltage of the storage capacitor Cst provides better liquid crystal tilting effect.

Figure 7A:
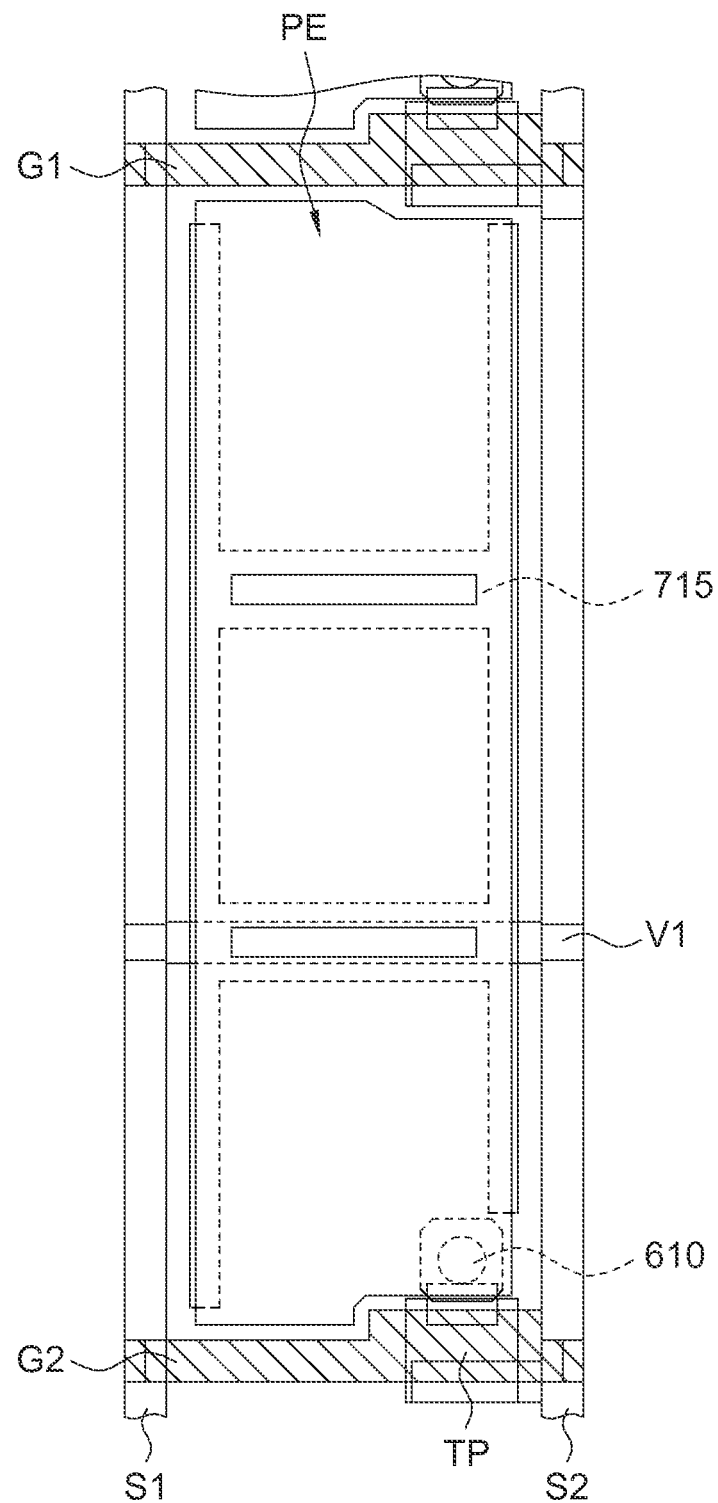
FIGS. 7A~7C are structural diagrams of a pixel unit according to a second example of the present embodiment of the invention.
Figure 7B:
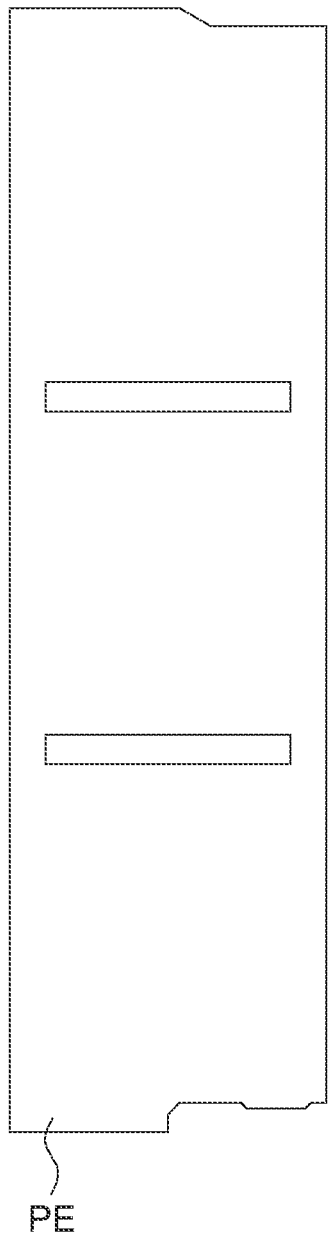
Figure 7C:
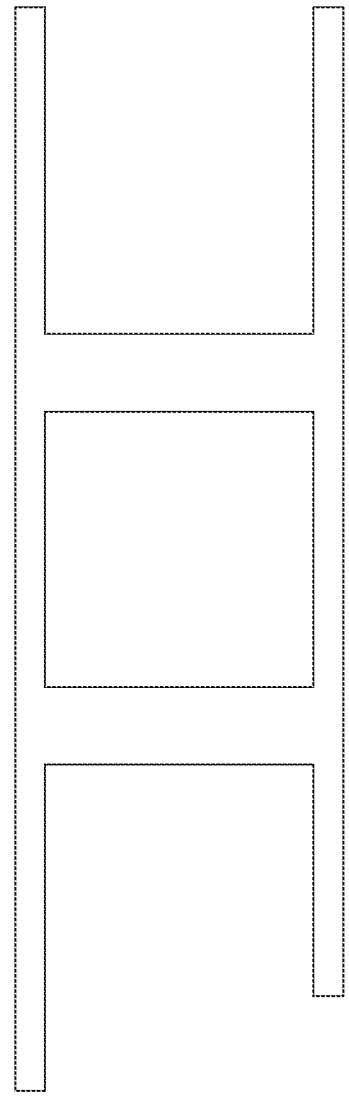

FIG. 7A shows a structural diagram of a pixel unit according to a second example of the present embodiment of the invention. As indicated in FIG. 7A, the electrode 715 is a double H electrode, so the storage capacitor Cst is also a double H capacitor. The electrode 715 is disposed along the pixel electrode PE, the scan line and the data line. The electrode 715 is directly electrically connected to the node V1 and the storage capacitor charge transistor. FIG. 7B and FIG. 7C respectively show the pixel electrode PE and the electrode 715 of FIG. 7A.

Figure 8A:
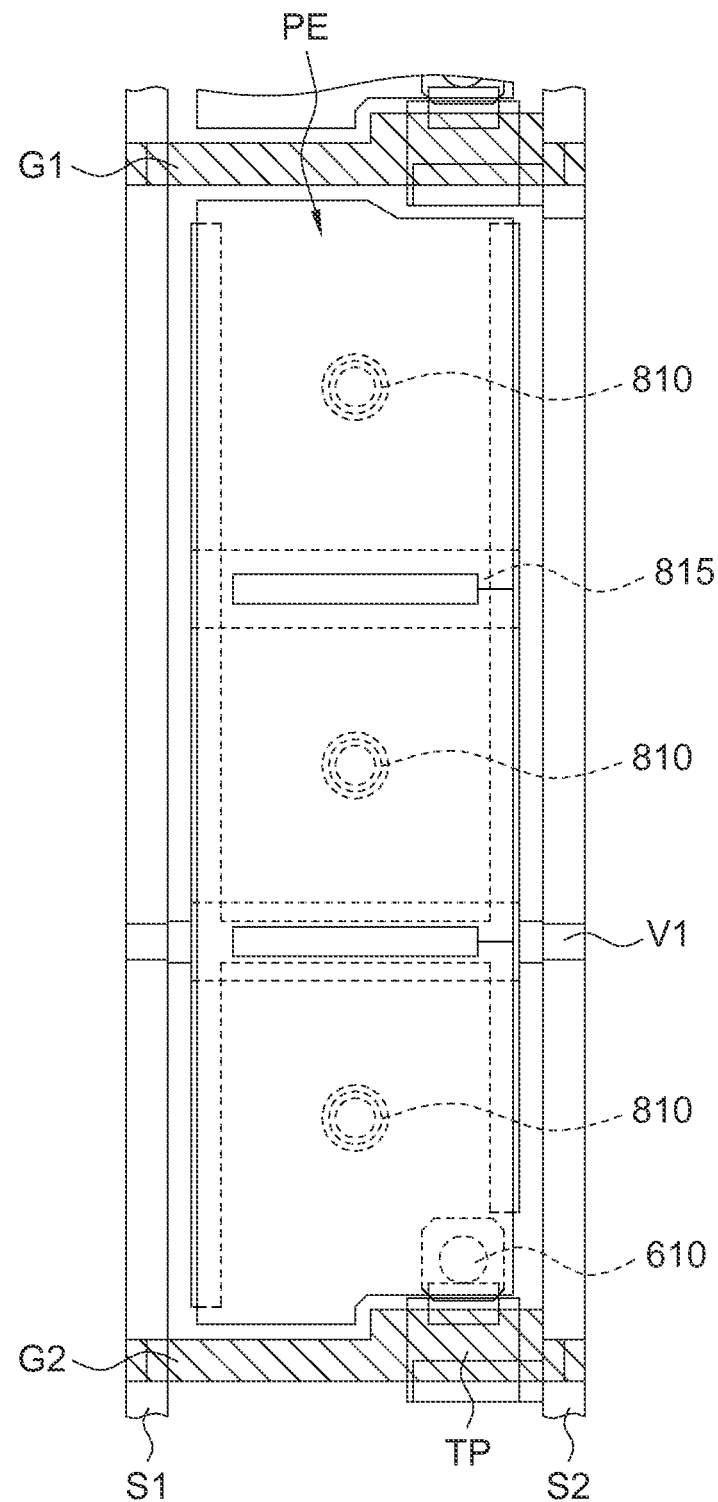
FIGS. 8A~8C are structural diagrams of a pixel unit according to a third example of the present embodiment of the invention.
Figure 8B:
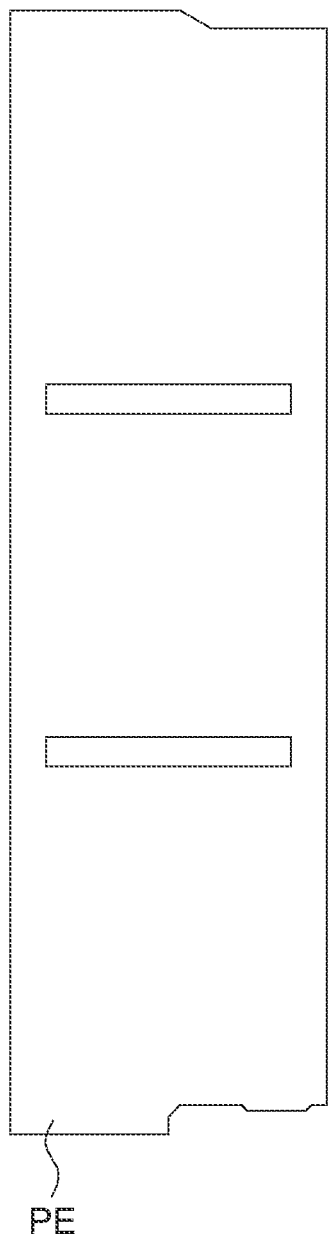
Figure 8C:
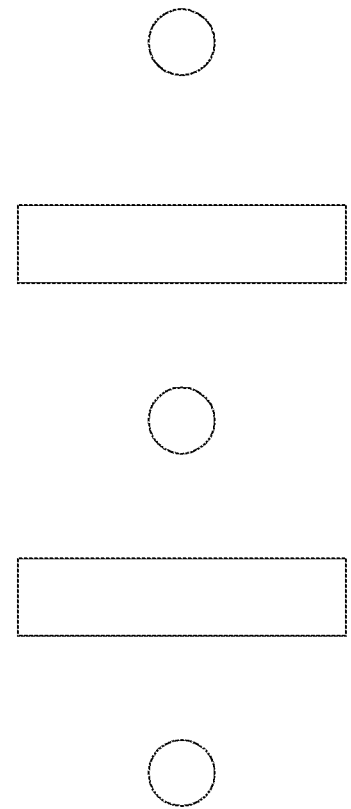

FIG. 8A shows a structural diagram of a pixel unit according to a third example of the present embodiment of the invention. As indicated in FIG. 8A, at least one protrusion 810 is disposed on the pixel electrode of the pixel unit. The protrusion 810 is formed by but is not limited to a five-layered material. The protrusion 810 can simulate a bump which is helpful in alignment of the liquid crystal. FIG. 8B and FIG. 8C respectively show the pixel electrode PE and the electrode 815 of FIG. 8A. The electrode 815 is directly electrically connected to the node V1 and the storage capacitor charge transistor.

Here, bump refers to a color filter (CF) protrusion for enhancing the liquid crystal tilting effect. In the present embodiment of the invention, the protrusion 810, which enhances the liquid crystal tilting effect, is low cost and does not affect liquid crystal transmittance.

Figure 9A:
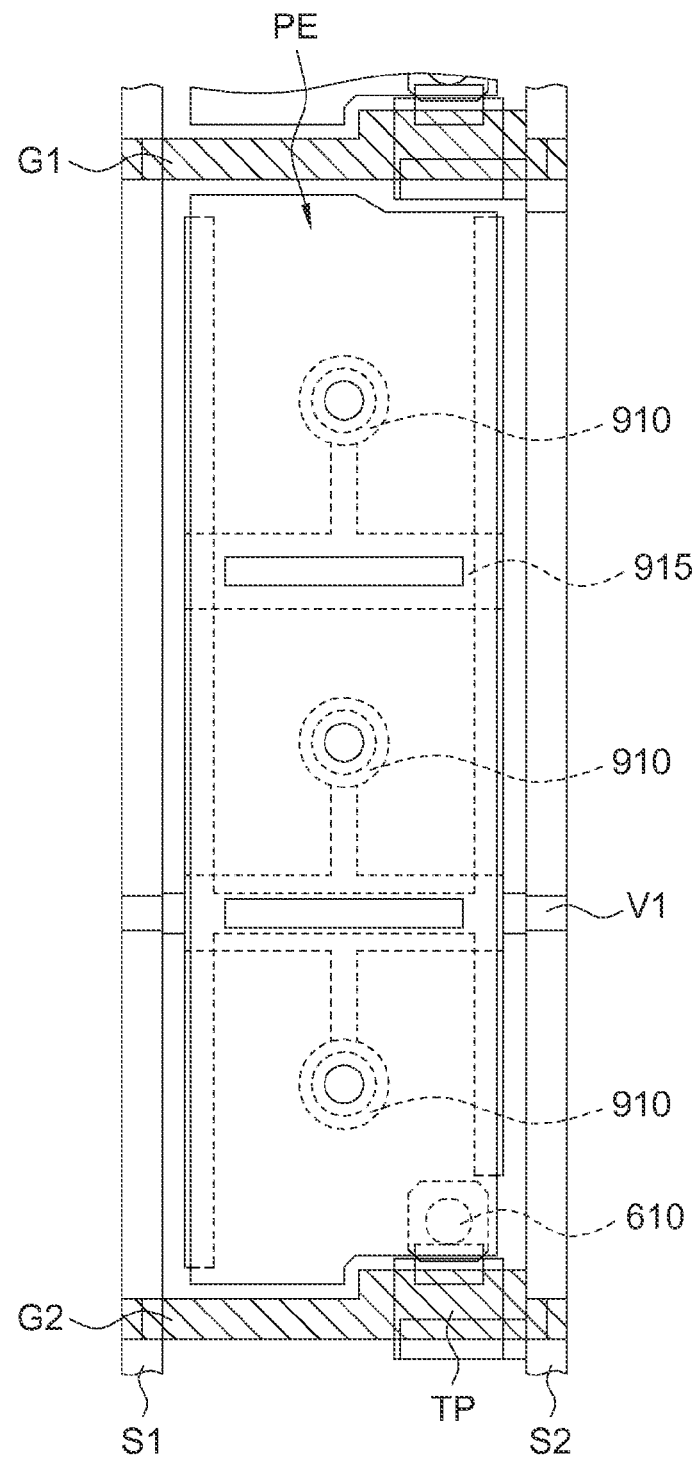
FIGS. 9A~9C are structural diagrams of a pixel unit according to a fourth example of the present embodiment of the invention.
Figure 9B:
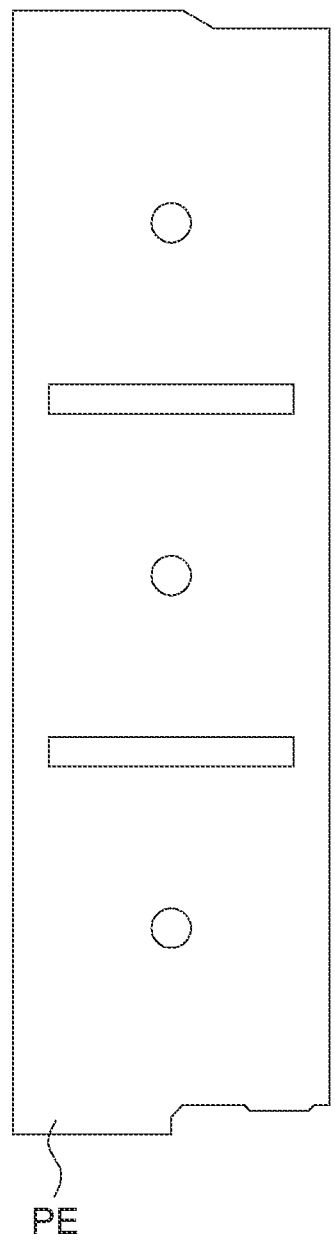
Figure 9C:
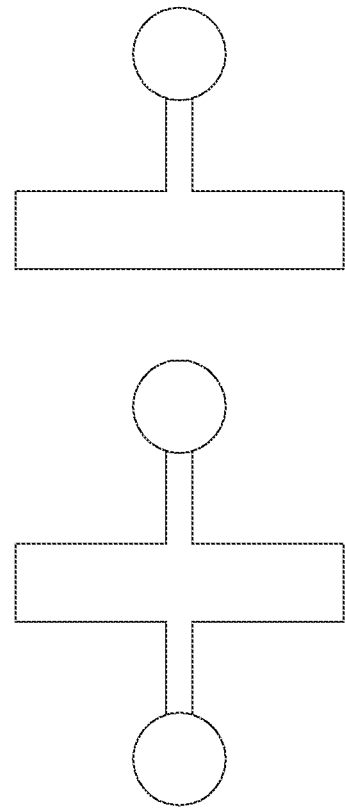

FIG. 9A shows a structural diagram of a pixel unit according to a fourth example of the present embodiment of the invention. As indicated in FIG. 9A, at least one pixel electrode via hole 910 is further formed on the pixel electrode of the pixel unit. The pixel electrode via hole 910 also simulates the bump which is helpful in alignment of the liquid crystal. Likewise, the pixel electrode via hole 910 achieves the same or similar effect as the bump (for example, to enhance the liquid crystal tilting effect). Besides, the use of the pixel electrode via hole 910 is low cost and does not affect the liquid crystal transmittance. FIG. 9B and FIG. 9C respectively show the pixel electrode PE and the electrode 915 of FIG. 9A. The electrode 915 is directly electrically connected to the node V1 and the storage capacitor charge transistor.

It will be appreciated by those skilled in the art that changes could be made to the disclosed embodiments described above without departing from the broad inventive concept thereof. It is understood, therefore, that the disclosed embodiments are not limited to the particular examples disclosed, but is intended to cover modifications within the spirit and scope of the disclosed embodiments as defined by the claims that follow.

What is claimed is:

1. A display panel, comprising:
    a pixel array comprising a plurality of pixel units each at least comprising a storage capacitor defined by a pixel electrode and an electrode being disposed along the pixel electrode;
    a plurality of scan lines coupled to the pixel units;
    a plurality of data lines intersect with the scan lines and coupled to the pixel units; and
    a plurality of storage capacitor charge transistors, at least one of the storage capacitor charge transistors comprising:
        a first terminal coupled to the storage capacitor of the pixel unit;
        a second terminal coupled to an $n^{th}$ scan line of the scan lines; and
        a third terminal coupled to an $(n+1)^{th}$ scan line of the scan lines, wherein n is an integer equal or larger than 1;
    wherein the pixel electrode has a plurality of holes between two of the data lines adjacent to each other, the electrode includes a patterned sheet having a shape conformed with the shape of the holes of the pixel electrode and located right under the holes of the pixel electrode, the storage capacitor charge transistors charge the storage capacitors of the corresponding pixel units with the second scan line of the scan lines only when the first scan line of the scan lines is turn on.

2. The display panel according to claim 1, wherein the storage capacitor comprises:
    a first terminal coupled to the first terminal of the storage capacitor charge transistor; and
    a second terminal.

3. The display panel according to claim 2,
    wherein each pixel unit further comprises:
    an active element comprising a first terminal coupled to one of the scan lines, a second terminal coupled to one of the data lines, and a third terminal coupled to the second terminal of the storage capacitor; and
    a liquid crystal capacitor comprising a first terminal coupled to the second terminal of the storage capacitor, and a second terminal coupled to a common voltage.

4. The display panel according to claim 3, wherein when the $n^{th}$ scan line of the scan lines is turned on and maintains at a first potential and the $(n+1)_{th}$ scan line of the scan lines is turned off and maintains at a second potential, the storage capacitor charge transistor is turned on, so that the first terminal of the storage capacitor maintains at the second potential and the second terminal of the storage capacitor maintains at a potential of one of the data lines.

5. The display panel according to claim 4, wherein when the $n^{th}$ scan line of the scan lines is turned off and maintains at the second potential and the $(n+1)^{th}$ scan line of the scan lines is turned on and maintains at the first potential, the storage capacitor charge transistor is turned off, so that the first terminal of the storage capacitor is in floating.

6. The display panel according to claim 1, wherein the opening of the pixel electrode is a hole.

7. A display panel, comprising:
    at least one pixel unit comprising at least one storage capacitor defined by a pixel electrode and an electrode being disposed along the pixel electrode, the storage capacitor comprising:
    a first terminal; and
    a second terminal;
    a plurality of scan lines;
    a first scan line coupled to the pixel unit;
    a second scan line; and
    at least one storage capacitor charge transistor comprising a first terminal coupled to the first terminal of the storage capacitor of the pixel unit, a second terminal coupled to the first scan line and a third terminal coupled to the second scan line;
    wherein the pixel electrode has a plurality of holes between two of the data lines adjacent to each other, the electrode includes a patterned sheet having a shape conformed with the shape of the holes of the pixel electrode and located right under the holes of the pixel electrode, the storage capacitor charge transistor charges the storage capacitor of the pixel unit with the second scan line only when the first scan line is turn on.

8. The display panel according to claim 7, wherein the pixel unit further comprises:
an active element comprising a first terminal coupled to the first scan line, a second terminal coupled to one of the data line, and a third terminal coupled to the second terminal of the storage capacitor; and
a liquid crystal capacitor comprising a first terminal coupled to the second terminal of the storage capacitor, and a second terminal coupled to a common voltage.

9. The display panel according to claim 8, wherein when the first scan lines is turned on and maintains at a first potential and the second scan lines is turned off and maintains at a second potential, the storage capacitor charge transistor is turned on, so that the first terminal of the storage capacitor maintains at the second potential and the second terminal of the storage capacitor maintains at a potential of the one of the data line.

10. The display panel according to claim 9, wherein when the first scan lines is turned off and maintains at the second potential and the second scan lines is turned on and maintains at the first potential, the storage capacitor charge transistor is turned off, so that the first terminal of the storage capacitor is in floating.

11. The display panel according to claim 7, wherein the opening of the pixel electrode is a hole.

12. A display panel, comprising:
at least one first active element; and
a plurality of pixel unit each comprising:
a data line;
a scan line;
a pixel electrode having a plurality of holes between the data line and another data line adjacent to the data line;
a second active element having a first terminal coupled to the scan line, a second terminal coupled to the data line, and a third terminal coupled to the pixel electrode; and
an electrode coupled to the at least one first active element, for receiving a scan signal of another scan line through the at least one first active element; wherein a part of the electrode is coupled to the opening of the pixel electrode, the electrode includes a patterned sheet having a shape conformed with the shape of the holes of the pixel electrode and located right under the holes of the pixel electrode, and a storage capacitor is defined by the electrode and the pixel electrode.

13. The display panel according to claim 12, wherein the opening of the pixel electrode is a hole.

* * * * *